United States Patent [19]
Mori et al.

[11] Patent Number: 6,029,516
[45] Date of Patent: Feb. 29, 2000

[54] VIBRATING GYROSCOPE CAPABLE OF SELF-DIAGNOSING BY PSEUDO-CORIOLIS FORCE GENERATING MEANS

[75] Inventors: Akira Mori, Nagaokakyo; Akira Kumada, Otsu, both of Japan

[73] Assignee: Murata Manufacturing Co., Ltd., Japan

[21] Appl. No.: 09/159,716

[22] Filed: Sep. 24, 1998

[30] Foreign Application Priority Data

Sep. 25, 1997 [JP] Japan .................................. 9-279621

[51] Int. Cl.[7] ................................ G01P 21/00; G01P 3/00
[52] U.S. Cl. .................................... 73/504.12; 73/504.14; 73/1.37; 310/316; 310/367
[58] Field of Search ........................... 73/504.04, 504.12, 73/504.13, 504.14, 504.15, 504.16, 1.37, 1.38; 310/316, 317, 318, 367, 368, 369, 370, 329

[56] References Cited

U.S. PATENT DOCUMENTS

| 4,665,748 | 5/1987 | Peters | 73/504.12 |
| 5,426,970 | 6/1995 | Florida et al. | 73/504.16 |
| 5,652,374 | 7/1997 | Chia et al. | 73/1.38 |

FOREIGN PATENT DOCUMENTS 7-83951   3/1995   Japan .

*Primary Examiner*—Hezron Williams
*Assistant Examiner*—Helen C. Kwok
*Attorney, Agent, or Firm*—Ostrolenk, Faber, Gerb & Soffen, LLP

[57] ABSTRACT

A vibrating gyroscope includes: a column-shaped vibrating body; driving elements formed on side-faces of the vibrating body, for exciting a bending vibration in the vibrating body; detection elements formed on side-faces of the vibrating body, for detecting changes in the bending vibration of the vibrating body; pseudo-Coriolis force generating elements formed on side-faces of the vibrating body, for applying a force to the vibrating body in the same direction as that of a Coriolis force generated when a rotational angular velocity is produced about the vibrating body; and a pseudo-Coriolis signal generating circuit for supplying the pseudo-Coriolis force generating elements with a pseudo-Coriolis signal to apply a force in the same direction as that of the Coriolis force to the vibrating body.

10 Claims, 12 Drawing Sheets

VIBRATING GYROSCOPE CAPABLE OF SELF-DIAGNOSING BY PSEUDO-CORIOLIS FORCE GENERATING MEANS

BACKGROUND OF THE INVENTION

1. Field of the Invention

The present invention relates to a vibrating gyroscope, and more particularly to a vibrating gyroscope for measuring the rotational angular velocity for use in techniques such as navigation of cars, control of vehicle attitude, and correction of camera shake.

2. Description of the Related Art

FIG. 14 is a perspective view illustrating an example of a conventional vibrator, and FIG. 15 is a block diagram showing a conventional vibrating gyroscope having the vibrator. A vibrator 1 comprises a vibrating body 2 in a form such as a regular triangular prism. Piezoelectric devices 3a, 3b, and 3c are formed in the center portions of the three side-surfaces of the vibrating body 2, respectively. The piezoelectric devices 3a and 3b are connected to electric charge detecting circuits 4a and 4b, and output signals of the electric charge detecting circuits 4a and 4b are added and then input into driving circuit 5. In the driving circuit 5, the input signal is amplified and phase-corrected, and the obtained signal is in turn supplied to the piezoelectric device 3c as a driving signal. This results in a bending vibration of the vibrating body 2 in the direction perpendicular to the surface on which the piezoelectric device 3c is formed.

The electric charge detecting circuits 4a and 4b are also connected to a detecting circuit 6. The detecting circuit 6 comprises a differential circuit, a synchronous detection circuit, a smoothing circuit, and a DC amplifier circuit, etc. In the differential circuit, the difference between the output-signals of the electric charge detecting circuits 4a and 4b is obtained and the output-signal of the differential circuit is in turn detected, smoothed, and amplified. When there is no rotation, since the states of bending of the piezoelectric devices 3a and 3b are the same, electric charges generated in the piezoelectric devices 3a and 3b are the same. Therefore, output signals from the electric charge detecting circuits 4a and 4b are the same, and an output signal of the detecting circuit 6, where the difference of the output signals therebetween is measured, is zero. When the vibrating body 2 is rotated about its axis at an angular velocity ω, as shown in FIG. 14, the direction of the bending vibration in the vibrating body 2 is changed by means of a Coriolis force. Accordingly, the bending states of the piezoelectric devices 3a and 3b are changed to generate a difference in the charges generated by the piezoelectric devices 3a and 3b, and to generate a difference in the output signals from the electric charge detecting circuits 4a and 4b. Therefore, a signal is output from the differential circuit of the detecting circuit 6 and the signal in turn is detected, smoothed, and amplified to obtain a DC signal corresponding to the angular velocity.

There is also known a vibrating gyroscope which comprises a vibrator utilizing a tuning fork-shaped vibrating body 2, as shown in FIGS. 16 and 17. In this vibrator 8, the vibrating body 2 is formed by driving plates 2a and detecting plates 2b, with surfaces thereof being disposed perpendicular to each other. In the driving plates 2a, piezoelectric devices for driving 7a are formed while in the driving plates 2b, piezoelectric devices for detecting 7b are formed. Between the two piezoelectric devices for driving, a driving circuit is connected and an output signal from one piezoelectric device 7a for driving is used as feedback to supply a driving signal to another piezoelectric device 7a for driving. This results in vibrating the vibrating body 2 so as to open/close it.

When there is no rotation, since the detecting plates 2b move in the directions of their widths, no bending is generated in the detecting plates 2b. Accordingly, the output signal becomes zero, which indicates no rotational angular velocity. When a rotational angular velocity is generated about the axis of the vibrating body 2, a bending vibration is generated by means of a Coriolis force in the direction perpendicular to the surfaces of the detecting plates 2b, i.e. in the direction of the thickness of the detecting plates 2b. At this time, as two detecting plates bend in the directions opposite to each other, a difference is generated in the charges generated by the two piezoelectric devices 7b which can be converted to a DC signal corresponding to the Coriolis force.

In these vibrating gyroscopes, the output sensitivity may be varied depending on changes in the outside environment, vibrations, physical shocks, etc. These vibrating gyroscopes, however, have no way of diagnosing changes in an output sensitivity by themselves and have not been able to judge their failures.

SUMMARY OF THE INVENTION

It is therefore a principal object of the present invention to provide a vibrating gyroscope that is capable of judging itself whether a predetermined output sensitivity is maintained or not.

A vibrating gyroscope according to the present invention comprises:

a vibratable body; driving means formed on said vibratable body for exciting a bending vibration in said vibratable body; detection means formed on said vibratable body for detecting changes in the bending vibration of said vibratable body; pseudo-Coriolis force generating means formed on said vibratable body for applying a force to said vibratable body in the same direction as that of a Coriolis force generated when a rotational angular velocity is produced about said vibratable body; and pseudo-Coriolis signal generating means for supplying said pseudo-Coriolis force generating means with a pseudo-Coriolis signal to apply a force in the same direction as that of said Coriolis force to said vibratable body.

A vibrating gyroscope according to one aspect of the present invention comprises: a column-shaped vibratable body; driving means formed on side-faces of the vibratable body for exciting a bending vibration in the vibratable body; detection means formed on side-faces of the vibratable body for sensing changes in a bending vibration of the vibratable body; pseudo-Coriolis force generating means formed on side-faces of the vibratable body for applying a force to the vibratable body in the same direction to that of a Coriolis force generated when a rotational angular velocity is produced about the vibratable body; and pseudo-Coriolis signal generating means for supplying the pseudo-Coriolis force generating means with a pseudo-Coriolis signal to apply a force in the same direction to that of the Coriolis force to the vibratable body.

In this vibrating gyroscope, single means may serve as the driving means and also as the pseudo-Coriolis force generating means.

In this vibrating gyroscope, single means may serve as the driving means, as the detection means and also as the pseudo-Coriolis force generating means.

The present invention also provides in accordance with another aspect thereof a vibrating gyroscope comprising: a tuning fork-shaped vibratable body; driving means formed on side-faces of the vibratable body for exciting a vibration in the vibratable body so as to open/close the vibratable body; detection means formed on side-faces of the vibratable body for sensing changes in a vibration of the vibratable body; pseudo-Coriolis force generating means formed on side-faces of the vibratable body, for applying a force to the vibratable body in the same direction to that of a Coriolis force generated when a rotational angular velocity is produced about the vibratable body; and pseudo-Coriolis signal generating means for supplying the pseudo-Coriolis force generating means with a pseudo-Coriolis signal to apply a force in the same direction to that of the Coriolis force to the vibratable body.

In these vibrating gyroscopes having a column-shaped vibratable body or a tuning fork-shaped vibratable body, single means may serve as the detection means and also as the pseudo-Coriolis force generating means.

In these vibrating gyroscopes, the vibratable body is excited in the same direction to that of the Coriolis force by applying the pseudo-Coriolis signal to the pseudo-Coriolis force generating means when the vibratable body is vibrating.

The driving means causes a bending vibration to be excited in a column-shaped vibratable body and a vibration to be excited in a tuning fork-shaped vibratable body so as to open/close the vibratable body. By applying a Coriolis signal to the pseudo-Coriolis force generating means, the same vibration as when a fixed Coriolis force is applied, is excited in the vibratable body. Therefore, if a signal obtained from the detection means is stored when a pseudo-Coriolis signal is supplied to the vibrating gyroscope with a predetermined output sensitivity, changes in the output sensitivity can be recognized by comparing signals between an output signal of the detection means due to a vibration generated by the pseudo-Coriolis force generating means when testing and the stored signal. That is, as the vibratable body vibrates also in the direction of a Coriolis force by supplying a pseudo-Coriolis signal when the vibratable body is vibrating, changes in the output sensitivity can be self-diagnosed by measuring an output signal of the detection means.

The configuration of the vibrating gyroscope can be simplified by sharing the same means for pseudo-Coriolis force generating means and driving means or by sharing the same means for pseudo-Coriolis force generating means and detection means or also by sharing the same means for pseudo-Coriolis force generating means, driving means and also for detection means.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
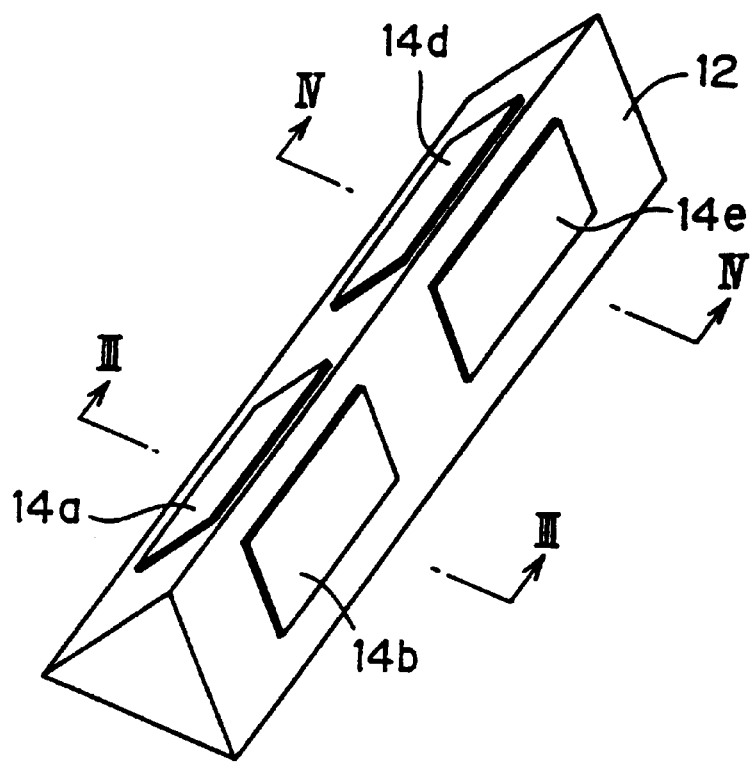
FIG. 1 is a perspective view illustrating a vibrator used in a vibrating gyroscope according to a first embodiment of the invention.
Figure 2:
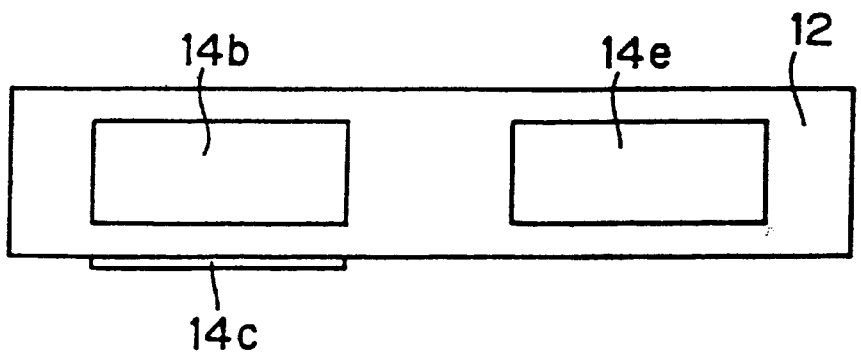
FIG. 2 is a side view of the vibrator shown in FIG. 1.

FIG. 1 is a perspective view illustrating a vibrator 101 used in a vibrating gyroscope 111 (FIG. 5) according to a first embodiment of the present invention, and FIG. 2 is a side view of the vibrator 101. The vibrator 101 comprises a vibratable body 12 in a shape such as a regular triangular prism. The vibrating body 12 is formed of a material, which generally generates a mechanical vibration, such as elinvar, an iron-nickel alloy, quartz, glass, or ceramic. On the three side-faces of the vibrating body 12 in positions adjacent to one end in the longitudinal direction of the vibrating body 12 from its center, piezoelectric devices 14a, 14b and 14c are formed, while piezoelectric devices 14d and 14e are formed in positions adjacent to another end in the longitudinal direction of the vibrating body 12 from its center on the faces, where piezoelectric devices 14a and 14b are formed thereon, respectively.

The piezoelectric devices 14a and 14b are used as detection means for detecting changes in bending vibration of the vibrating body 12. The piezoelectric device 14c is used as driving means to excite a bending vibration of the vibrating body 12. At this time, the piezoelectric devices 14a and 14b are also used as feedback means for obtaining a driving signal to feed the driving means. The piezoelectric devices 14d and 14e are used as pseudo-Coriolis force generating means to generate a bending vibration of the vibrating body 12 in the same direction to that of a Coriolis force which is generated when a rotational angular velocity is produced about the axis of the vibrating body 2.

Figure 3:
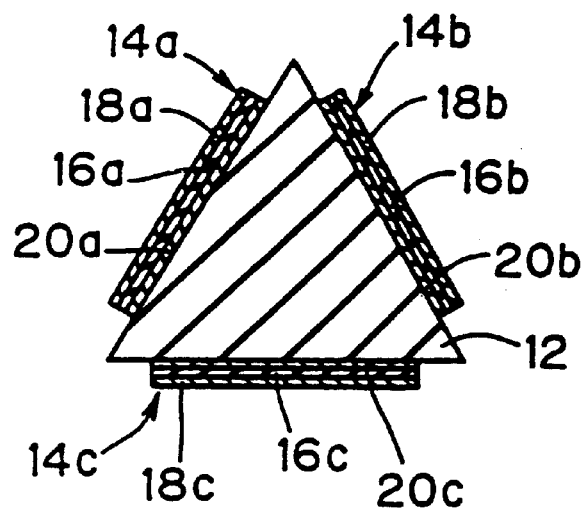
FIG. 3 is a cross-sectional view at the line III—III of FIG. 1.
Figure 4:
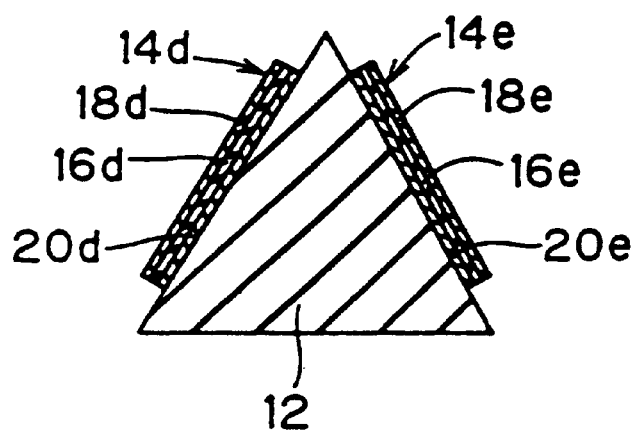
FIG. 4 is a cross-sectional view at the line IV—IV of FIG. 1.

The piezoelectric device 14a, as shown in FIG. 3, comprises a piezoelectric layer 16a composed of piezoelectric ceramics, etc. Electrodes 18a and 20a are formed on both sides of the piezoelectric layer 16a while one of them, the electrode 20a, is bonded to a side-face of the vibrating body 12. Similarly, the piezoelectric devices 14b and 14c comprise piezoelectric layers 16b and 16c, respectively, which in turn have electrodes 18b and 20b, and electrodes 18c and 20c on both sides thereof, respectively, while one of the pairs, electrodes 20b and 20c, are bonded to side-faces of the vibrating body 12. Also, as shown in FIG. 4, the piezoelectric devices 14d and 14e comprise piezoelectric layers 16d and 16e, respectively, which in turn have electrodes 18d and 20d, and electrodes 18e and 20e on both sides thereof, respectively, while one of the pairs, the electrodes 20d and 20e, are bonded to side-faces of the vibrating body 12.

Figure 5:
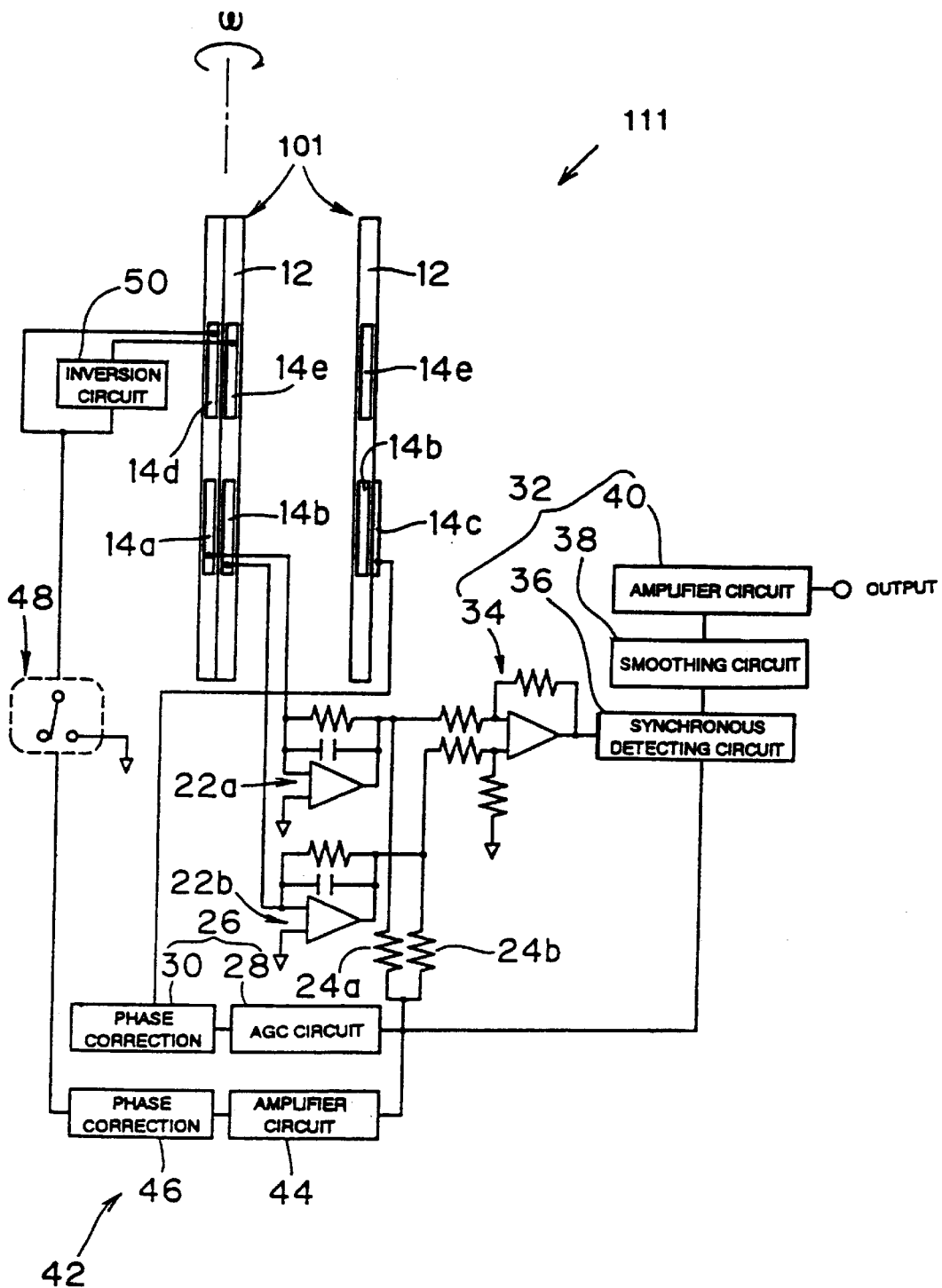
FIG. 5 is a block diagram illustrating a vibrating gyroscope having the vibrator shown in FIG. 1 according to the first embodiment of the present invention.

FIG. 5 shows a vibrating gyroscope 111 using the vibrator 101. In FIG. 5, the vibrator 101 is illustrated as views from two different directions in order to illustrate connecting relations between piezoelectric devices. The piezoelectric devices 14a and 14b are connected to electric charge detecting circuits 22a and 22b respectively, which, in turn, are respectively connected to one-end of resistors 24a and 24b. The other ends of the resistors 24a and 24b are coupled together to be connected to a driving circuit 26. The driving circuit 26 comprises an automatic gain control circuit (AGC circuit) 28 and a phase correction circuit 30 to adjust an amplitude and a phase of the signal synthesized in the resistors 24a and 24b. The signal, obtained in this way, is supplied to the piezoelectric device 14c as a driving signal.

The electric charge detecting circuits 22a and 22b are also connected to a detecting circuit 32. The detecting circuit 32 comprises a differential amplifier circuit 34 which outputs a difference between output signals of the electric charge detecting circuits 22a and 22b. The output terminal of the differential amplifier circuit 34 is coupled to a synchronous detection circuit 36 to detect the output signal of the differential amplifier circuit 34 synchronizing with the signal synthesized in the resistors 24a and 24b. The output signal of the synchronous detection circuit 36 is smoothed in a smoothing circuit 38 and then is amplified in an amplifier circuit 40.

The signal synthesized in the resistors 24a and 24b is also input to a pseudo-Coriolis signal generating circuit 42, which comprises an amplifier circuit 44, a phase correction circuit 46 and a switching device 48. The switching device 48 is connected to the piezoelectric device 14d while being coupled to the piezoelectric device 14e via an inversion circuit 50. In a normal operation, the piezoelectric device 14d and the inversion circuit 50 are connected to a reference potential by means of the switching device 48. The phase correction circuit 46 can be coupled to the piezoelectric device 14d and the inversion circuit 50 by switching the switching device 48. The switching device 48, for example, may employ a mechanical switch or a semiconductor-switching device.

In the vibrating gyroscope 111, the electric charge detecting circuits 22a and 22b output signals corresponding to charges generated in the piezoelectric devices 14a and 14b. These signals are synthesized in the resistors 24a and 24b to be adjusted in forms of amplitude and phase in the driving circuit 26. The signal, obtained in this way, is supplied as the driving signal to the piezoelectric device 14c such that the vibrating body 12 vibrates under the bending mode in the direction perpendicular to the surface on which the piezoelectric device 14c is formed. At this time, the vibrating body 12 vibrates under the bending mode at a constant amplitude owing to the AGC circuit 28 which maintains the driving signal at a constant amplitude.

When no rotation, as the bending states of the piezoelectric devices 14a and 14b are the same, charges generated in the piezoelectric devices 14a and 14b are the same. Accordingly, the signals obtained from the electric charge detecting circuits 22a and 22b are also the same, and no output signal in the differential amplifying circuit 34 is produced. This means that no rotational angular velocity is applied to the vibrator 101.

When a rotational angular velocity ω is produced about the axis of the vibrating body 12, as shown in FIG. 5, a Coriolis force is produced in the direction perpendicular to the direction of the bending vibration when there is no rotation. The vibrating direction of the vibrating body 12 is shifted by means of this Coriolis force. Accordingly, a difference between the bending states of the piezoelectric devices 14a and 14b is developed to produce a difference between the charges generated in the piezoelectric devices 14a and 14b. Therefore, a difference between the output signals of the electric charge detecting circuits 22a and 22b is produced such that a signal is output from the differential amplifying circuit 34. The output signal of the differential amplifier circuit 34 is detected in the synchronous detection circuit 36, synchronizing with the signal synthesized in the resistors 24a and 24b. As a result of this process, a signal is detected, which may be only the positive or only the negative portion, or also a reversed signal of either the positive or negative portion of the output signal of the differential amplifier circuit 34. The detected signal in the synchronous detection circuit 36 is smoothed in the smoothing circuit 38 and then is amplified in the amplifier circuit 40.

Changes in charges generated by the piezoelectric devices 14a and 14b correspond to changes in the bending direction of the vibrating body 12. Since changes in the bending direction of the vibrating body 12 correspond to a Coriolis force, the output signal from the detecting circuit 32 corresponds to a Coriolis force. Accordingly, the rotational angular velocity produced in the vibrator 101 can be measured by measuring the signal from the detecting circuit 32.

When the direction of the rotational angular velocity produced in the vibrator 101 is reversed, the bending vibration of the vibrating body 12 also changes to the reverse. Therefore, changes in charges generated by the piezoelectric devices 14a and 14b are reversed and the output signal from the differential amplifying circuit 34 becomes opposite in phase. Accordingly, the signal detected by the synchronous detection circuit 36 also becomes opposite in polarity and the DC signal output by the amplifier circuit 40 also becomes opposite in polarity. Therefore, the direction of the rotational angular velocity can be recognized by a polarity of the output signal of the detecting circuit 32.

In order to measure the output sensitivity in the vibrating gyroscope 111, the switching device 48 is switched while the vibrating body 12 is bending-vibrating. As a result, a signal synthesized in the resistors 24a and 24b is amplified by the amplifier circuit 44 of the pseudo-Coriolis signal generating circuit 42 and then is corrected in phase in the phase correction circuit 46. The signal, thus obtained, is supplied to the piezoelectric device 14d as a pseudo-Coriolis signal. The pseudo-Coriolis signal is also inverted by the inversion circuit 50 to supply to the piezoelectric device 14e. Accordingly, the piezoelectric devices 14d and 14e are supplied with signals being opposite in phase with each other. Therefore, a force is produced in the vibrating body 12 in the direction perpendicular to that of bending vibration when there is no rotation, so that the same bending vibration is excited as that when a real Coriolis force is applied.

At this time, since the bending vibration changes its direction in the same manner as that of a real Coriolis force, an output signal corresponding to that is obtained. Therefore, if the output value is stored when a pseudo-Coriolis signal is supplied to the vibrating gyroscope 10 with a predetermined output sensitivity, changes in the output sensitivity can be recognized by comparing values between the stored value and that obtained by applying a pseudo-Coriolis signal when testing. That is, a difference between the output signal when a pseudo-Coriolis signal is applied and the stored fixed value means an abnormal condition in the output sensitivity of the vibration gyroscope 10. Thus, this vibrating gyroscope 111 can self-diagnose changes in the sensitivity by applying a pseudo-Coriolis signal.

Figure 6:
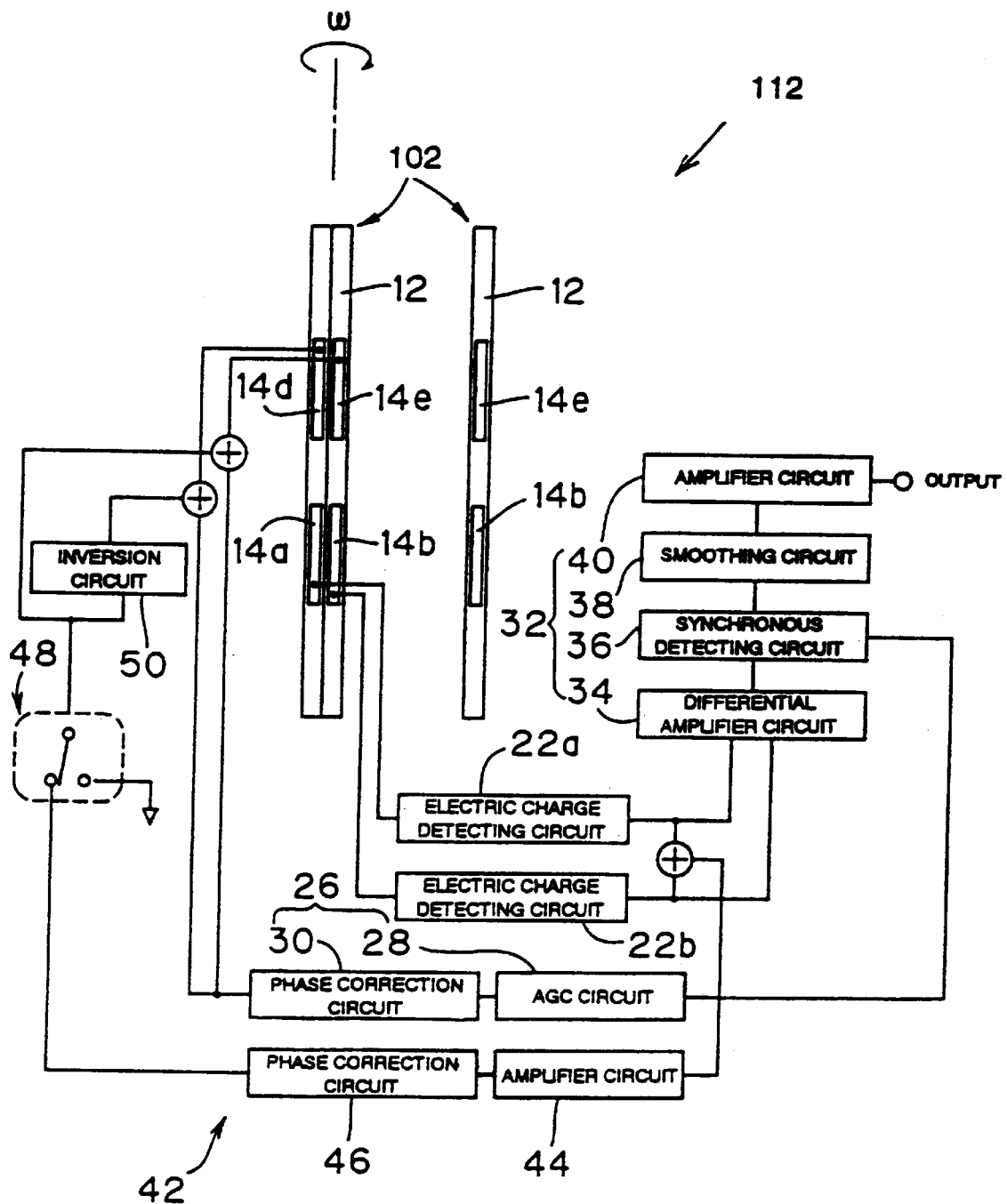
FIG. 6 is a block diagram illustrating a vibrating gyroscope according to a second embodiment of the present invention.

FIG. 6 is a block diagram illustrating a vibrating gyroscope 112 according to a second embodiment of the present invention, in which the piezoelectric devices 14d and 14e are used both as driving means and pseudo-Coriolis force generating means. The vibrating gyroscope 112 shown in FIG. 6 is different from the vibrating gyroscope 111 shown in FIG. 5 in that the piezoelectric device 14c is not formed in a vibrator 102. In this vibrating gyroscope 112, the output signal of the driving circuit 26 is supplied to the piezoelectric devices 14d and 14e. The pseudo-Coriolis signal generating circuit 42 is connected to the piezoelectric device 14e via the inversion circuit 50 as well as to the piezoelectric device 14d, similarly to the vibrating gyroscope 111 shown in FIG. 5.

In the vibrating gyroscope 112, a bending force is generated in the direction perpendicular to the surface of the vibrating body 12 on which the piezoelectric device 14d is formed, by applying a driving signal to the piezoelectric device 14d. Also generated is a bending force in the direction perpendicular to the surface of the vibrating body 12 on which the piezoelectric device 14e is formed, by applying a driving signal to the piezoelectric device 14e. The resultant total force of these forces produces a bending vibration of the vibrating body 12 in the direction perpendicular to the surface on which there is no piezoelectric device formed. Measuring of the rotation angular velocity can be done similarly to the vibrating gyroscope 111 shown in FIG. 5.

In the vibrating gyroscope 112, a signal in opposite phase is supplied to the piezoelectric devices 14d and 14e, which were used for driving, by switching the switching device 48 when the vibrating body 14 is a bending-vibrating. This results in producing a force in the vibrating body 12 in the direction perpendicular to that of a bending vibration when there is no rotation. This force changes the bending vibration direction of the vibrating body 12 to obtain an output signal corresponding to that obtained when a real Coriolis force is applied. Therefore, the vibrating gyroscope 112 can self-diagnose any trouble in sensitivity by comparing values between the predetermined value and that obtained by applying a pseudo-Coriolis signal when testing.

Figure 7:
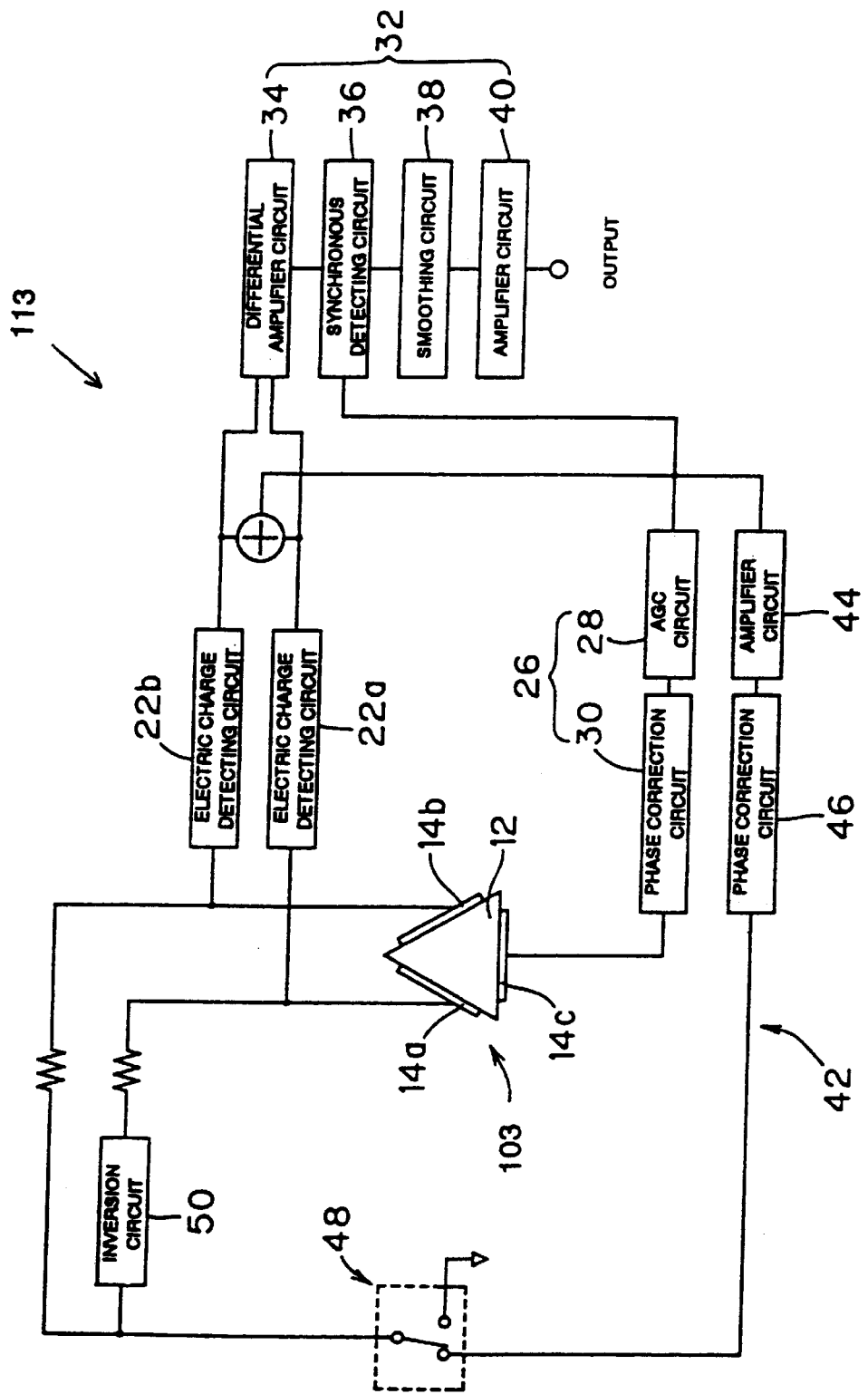
FIG. 7 is a block diagram illustrating a vibrating gyroscope according to a third embodiment of the present invention.
Figure 8:
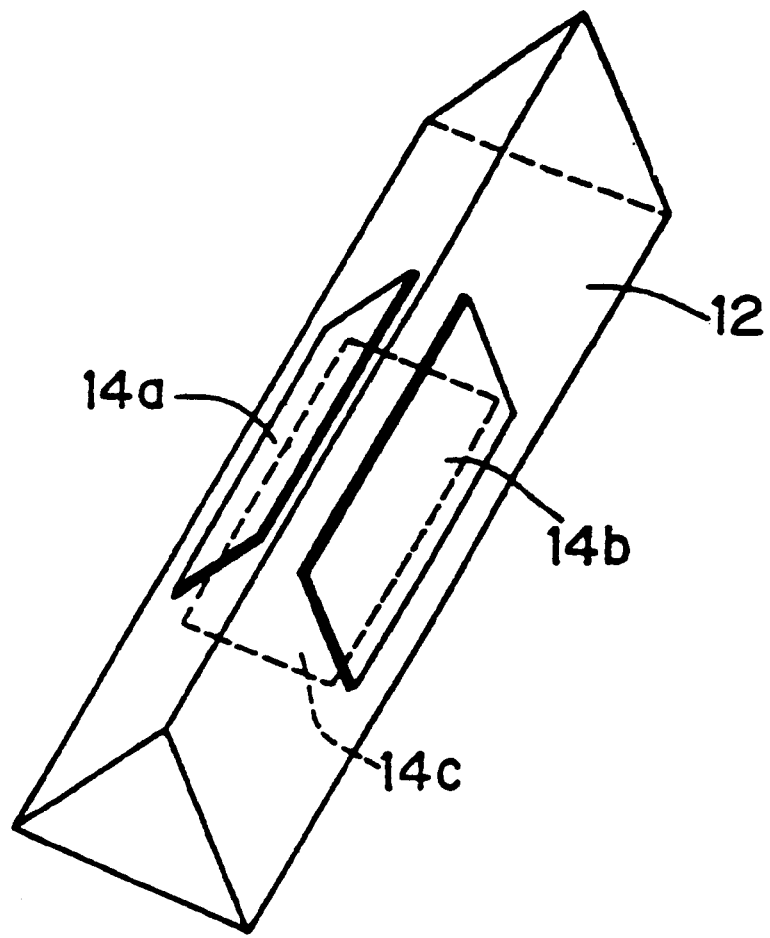
FIG. 8 is a perspective view illustrating the vibrator used in the vibrating gyroscope shown in FIG. 7.

FIG. 7 is a block diagram illustrating a vibrating gyroscope 113 according to a third embodiment in which detection means also serves as pseudo-Coriolis force generating means. The vibrating gyroscope 113 shown in FIG. 7 is different from the vibrating gyroscope 111 shown in FIG. 1 in that the piezoelectric devices 14a, 14b and 14c are formed in the center portions of the three side-faces of the vibrating body 14, respectively, while the piezoelectric devices 14d and 14e are not formed on any side-faces of the vibrating body 14, thereby forming a vibrator 103 as shown in FIG. 8.

In the vibrating gyroscope 113, the output signal of the driving circuit 26 is supplied to the piezoelectric device 14c. The piezoelectric devices 14a and 14b are connected to the detecting circuit 32 via the electric charge detecting circuits 22a and 22b. The pseudo-Coriolis signal generating circuit 42 is connected to the piezoelectric device 14a via the inversion circuit 50 as well as to the piezoelectric device 14b. That is, in this vibrating gyroscope 113, the piezoelectric devices 14a and 14b are used both as detection means and pseudo-Coriolis force generating means.

In this vibrating gyroscope 113, the vibrating body 12 is vibrated under the bending mode in the direction perpendicular to the face on which the piezoelectric device 14c is formed, due to the driving signal applied to the piezoelectric device 14c. Measuring of a rotation angular velocity can be done similarly to the vibrating gyroscope shown in FIG. 5.

Figure 9:
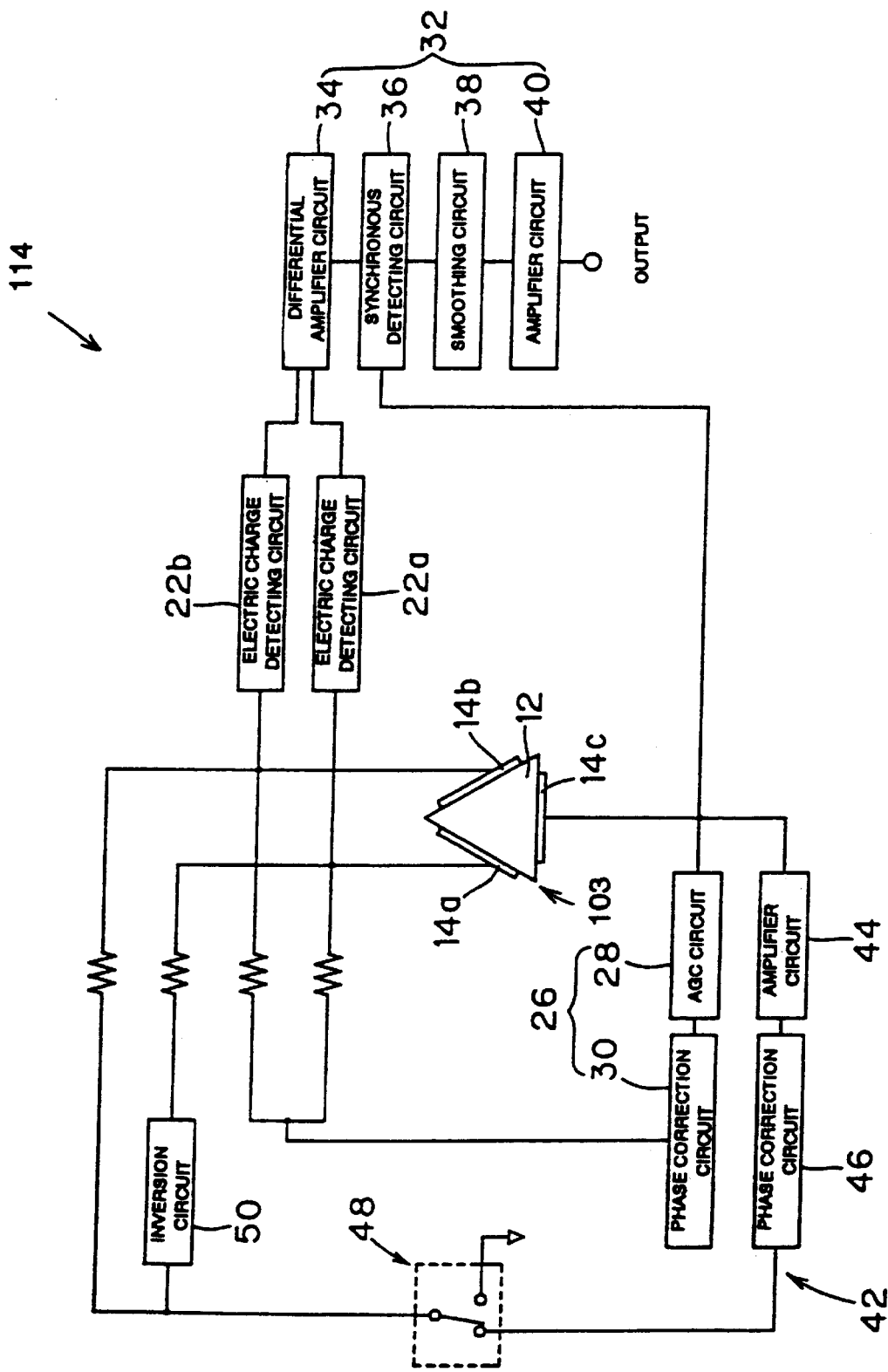
FIG. 9 is a block diagram illustrating a vibrating gyroscope according to a fourth embodiment of the present invention.

FIG. 9 is a block diagram illustrating a vibrating gyroscope 114 according to a fourth embodiment in which single means serves as driving means, as detection means and also as pseudo-Coriolis force generating means. This vibrating gyroscope 114 also has the vibrator 103 which has the three piezoelectric devices 14a, 14b, and 14c, as shown in FIG. 8. In the vibrating gyroscope 114, the output signal of the piezoelectric device 14c is input to the driving circuit 26 as a feedback signal and the output signal of the driving circuit 26 in turn is supplied to the piezoelectric devices 14a and 14b. The piezoelectric devices 14a and 14be are connected to the detecting circuit 32 via the electric charge detecting circuits 22a and 22b. The pseudo-Coriolis signal generating circuit 42 is connected to the piezoelectric device 14a via the inversion circuit 50 as well as to the piezoelectric device 14b. That is, in this vibrating gyroscope 114, the piezoelectric devices 14a and 14b are used triply as driving means, detection means, and pseudo-Coriolis force generating means.

In the vibrating gyroscope 114, similarly to the vibrating gyroscope 112 shown in FIG. 6, the vibrating body 12 is vibrated in the direction perpendicular to the face on which the piezoelectric devices 14c is formed, due to the driving signal applied to the piezoelectric devices 14a and 14b. Measuring of a rotation angular velocity can be done similarly to the vibrating gyroscope 111 shown in FIG. 5.

In these vibrating gyroscopes 113 and 114 shown in FIGS. 7 and 9, respectively, a signal in opposite phase is supplied to the piezoelectric devices 14a and 14b, which are used for detecting, or to the piezoelectric devices 14a and 14b, which are used for driving and detecting, by switching the switching device 48 when the vibrating body 14 is vibrating under the bending mode. This results in producing a force in the vibrating body 12 in the direction perpendicular to that of a bending vibration when there is no rotation. This force changes the bending vibration direction of the vibrating body 12 to obtain an output signal corresponding to that obtained when a real Coriolis force is applied. Therefore, the vibrating gyroscopes 113 and 114 can self-diagnose any trouble in the sensitivity by comparing values between the predetermined value and that obtained by applying a pseudo-Coriolis signal when testing.

Figure 10:
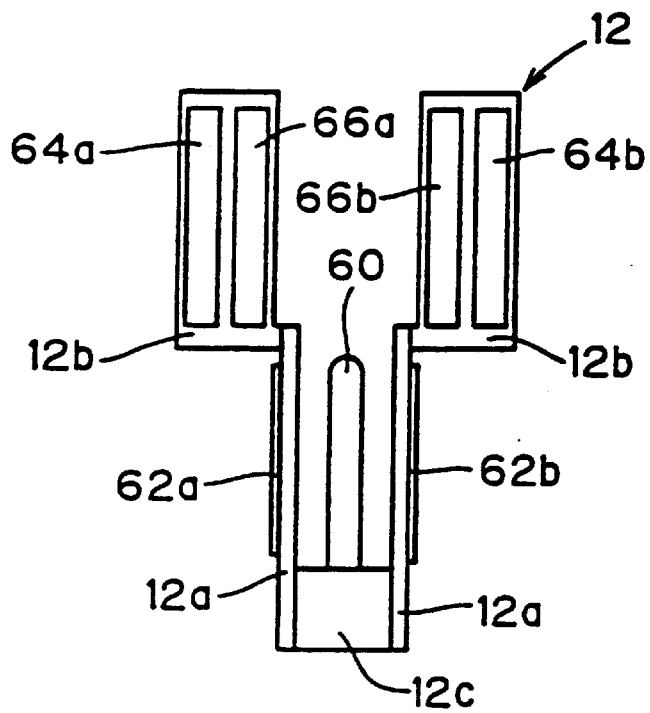
FIG. 10 is a plan view illustrating a vibrator used in a vibrating gyroscope according to a fifth embodiment of the present invention.
Figure 11:
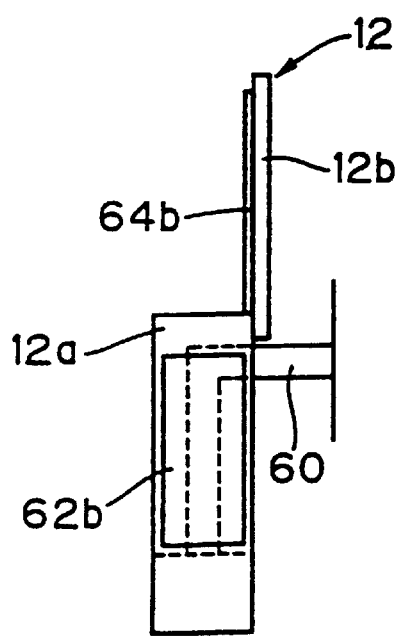
FIG. 11 is a side view illustrating the vibrator shown in FIG. 10.

According to a fifth embodiment of the present invention, changes in the output sensitivity can be checked in a vibrating gyroscope 115 utilizing a tuning fork-shaped vibrator 105, as shown in FIGS. 10 and 11. A vibrating body 12 of the vibrator 105 comprises two driving plates 12a disposed so that each face opposes each other and detecting plates 12b disposed in a plane orthogonal to that of the driving plates 12a. The detecting plates 12b are formed at one end of the lengths of the driving plates 12a and also at one end of the widths of the driving plates 12a. The other ends of the two driving plates 12a are connected to each other by a connecting member 12c to form the tuning fork-shaped vibrating body 12. An L-shaped supporting member 60 is formed between the two driving plates 12a extending upward from the center portion of the connecting member 12c. One end of this supporting member 60 is connected to a supporting base, etc.

Piezoelectric devices 62a and 62b are formed as driving means on the outside faces of the two driving plates 12a. Piezoelectric devices 64a, 64b and piezoelectric devices 66a, 66b are formed on the detecting plates 12b, as detection means and as pseudo-Coriolis signal generating means, respectively. At this time, the piezoelectric device 64a and the piezoelectric device 66a are formed on one of the detecting plates 12a side by side in the width direction while the piezoelectric device 64b and the piezoelectric device 66b are formed on the other of the detecting plates 12b side by side in the width direction.

Figure 12:
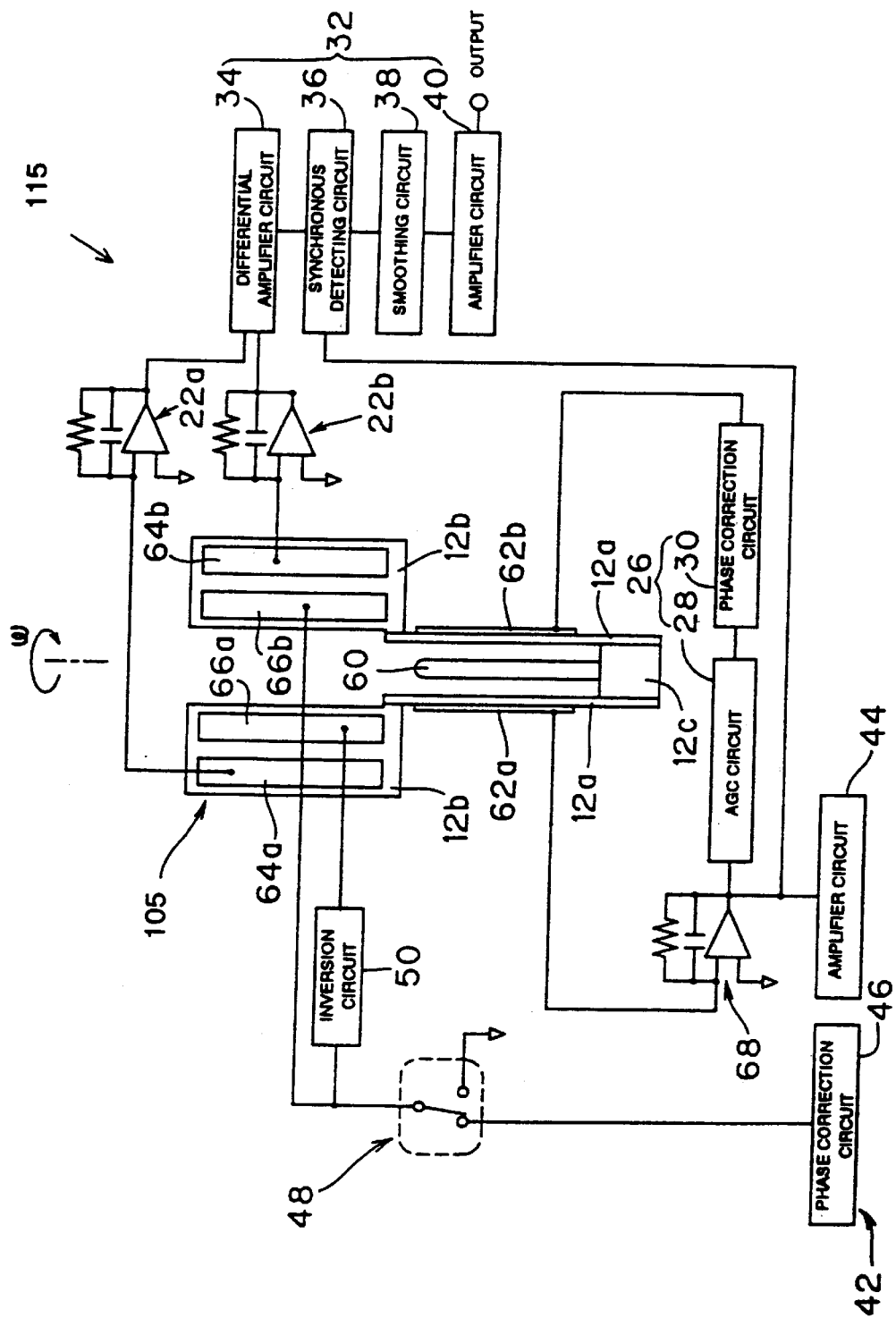
FIG. 12 is a block diagram illustrating a vibrating gyroscope according to the fifth embodiment of the present invention.

In the vibrating gyroscope 115, as shown in FIG. 12, one of the driving means, the piezoelectric device 62a, is connected to the electric charge detecting circuit 68, which in turn is connected to the driving circuit 26. The driving signal obtained in the driving circuit 26 is supplied to the other driving means, the piezoelectric device 62b. The two piezoelectric devices 64a and 64b are connected to the electric charge detecting circuits 22a and 22b, respectively, which in turn are connected to the detecting circuit 32. In the synchronous detecting circuit 36 of the detecting circuit 32, the output signal of the differential amplifier circuit 34 is detected, synchronized with the signal of the electric charge detecting circuit 68 in the driving side. The driving signal of the electric charge detecting circuit 68 is input to the pseudo-Coriolis signal generating circuit 42. The output signal of the pseudo-Coriolis signal generating circuit 42 is then supplied to the inversion circuit 50 and to the piezoelectric device 66b via a switching device 48. The output signal of the inversion circuit 50 is supplied to the piezoelectric device 66a.

In the vibrating gyroscope 115 utilizing the vibrator 105, the driving circuit 26 excites a bending vibration in the driving plates 12a. This causes an open/close vibration of the vibrating body 12 as a whole. When there is no rotation, since the detecting plates 12b vibrate in the direction of their widths, the detecting plates 12b do not bend. Therefore, the piezoelectric devices 64a and 64b do not generate any electric charge so that no output signal is generated from the detecting circuit 32.

When a rotational angular velocity ω is produced about the axis of the vibrating body 12, as shown in FIG. 12, a Coriolis force is produced in the direction perpendicular to the direction of the bending vibration of the vibrating body 12. That is, a Coriolis force is produced in the direction perpendicular to the surface of the detecting plates 12b. Therefore, bending in the detecting plates 12b is created so that the piezoelectric devices 64a and 64b generate electric charges. At this time, since the vibrating body 12 performs an open/close vibration, that is, the two driving plates 12a vibrate in opposite directions to each other, the Coriolis forces applied to the two detecting plates 12b are in opposite directions to each other. Accordingly, the two detecting plates bend in opposite directions to each other so that charges generated in the piezoelectric devices 64a and 64b are opposite in polarity. Accordingly, output signals from the electric charge detecting circuits 22a and 22b are opposite in phase, and by generating a difference between these signals from the differential amplifier circuit 34, a DC signal corresponding to the rotational angular velocity can be obtained from the detecting circuit 32. Also, the direction of the rotational angular velocity can be recognized by a polarity of the output signal of the detecting circuit 32.

In the vibrating gyroscope 115, a pseudo-Coriolis signal in opposite phase also can be supplied to the piezoelectric devices 66a and 66b by switching the switching device 48 when there is no rotation. This results in producing bending in the two detecting plates 12b in opposite directions to each other in a similar way when a real Coriolis force is applied. This bending generates electric charges in the piezoelectric devices 64a and 64b to output a signal from the detecting circuit 32. Therefore, if the output value is stored when a pseudo-Coriolis signal is supplied to the vibrating gyroscope 115 with a predetermined output sensitivity, changes in the output sensitivity can be recognized by comparing the value with the stored value.

Figure 13:
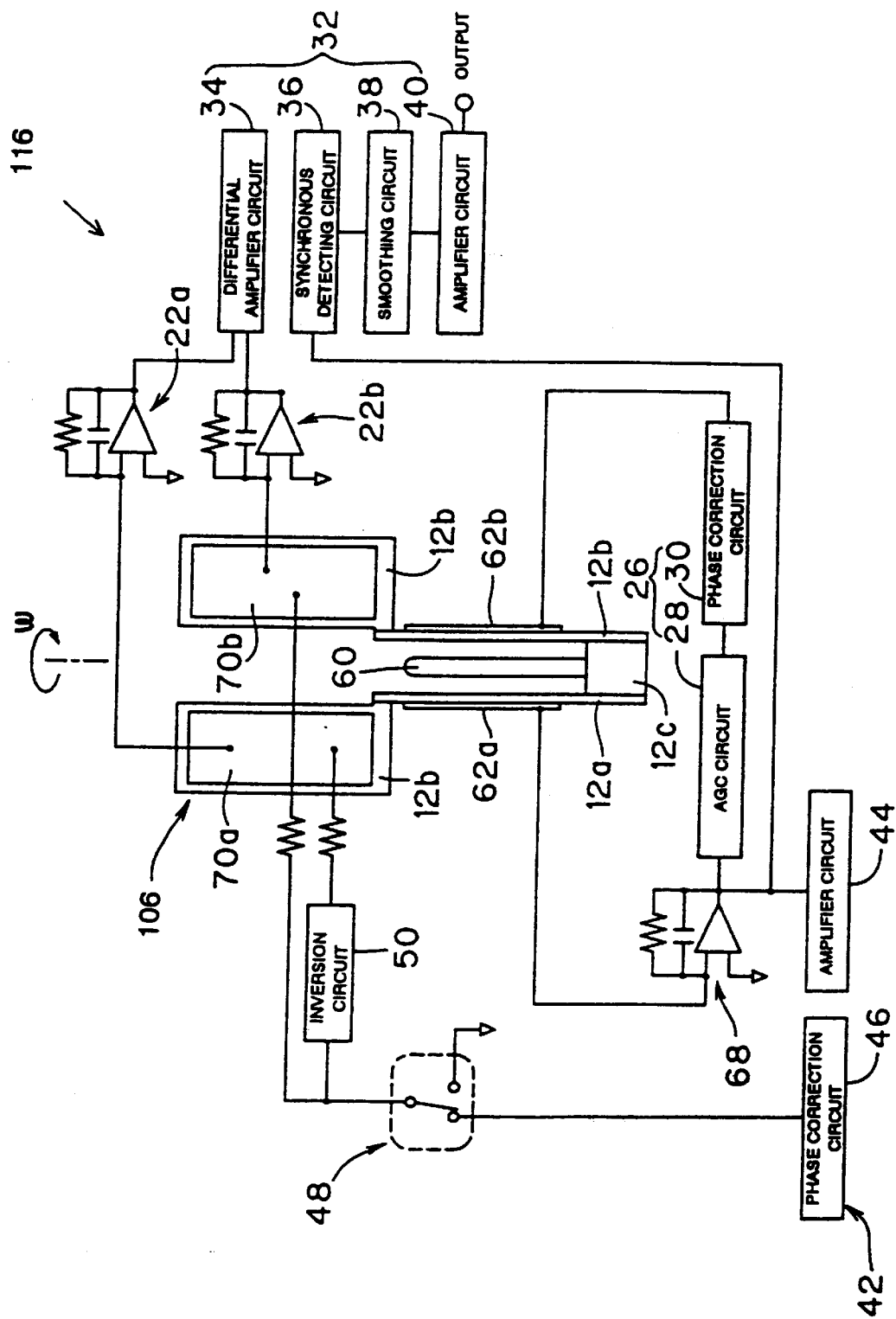
FIG. 13 is a block diagram illustrating a vibrating gyroscope according to the sixth embodiment of the present invention.
Figure 14:
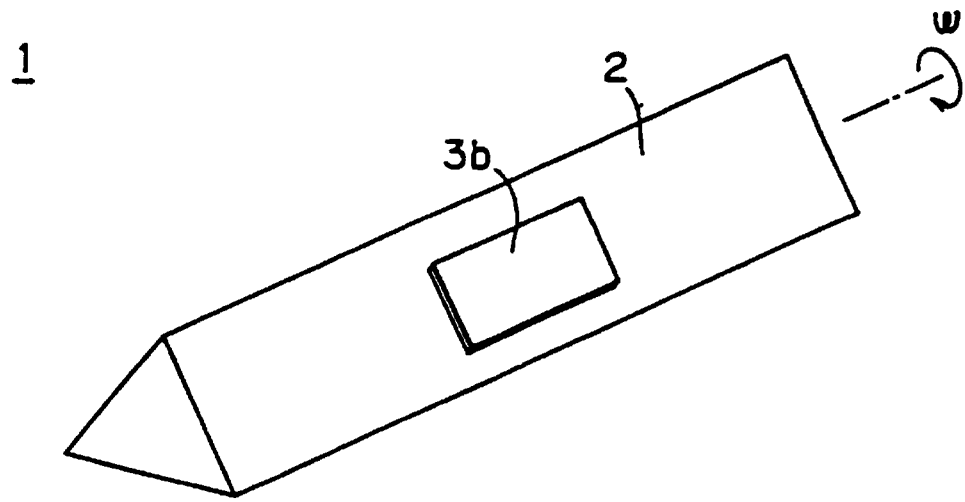
FIG. 14 is a perspective view illustrating a vibrator used in an example of a conventional vibrating gyroscope.
Figure 15:
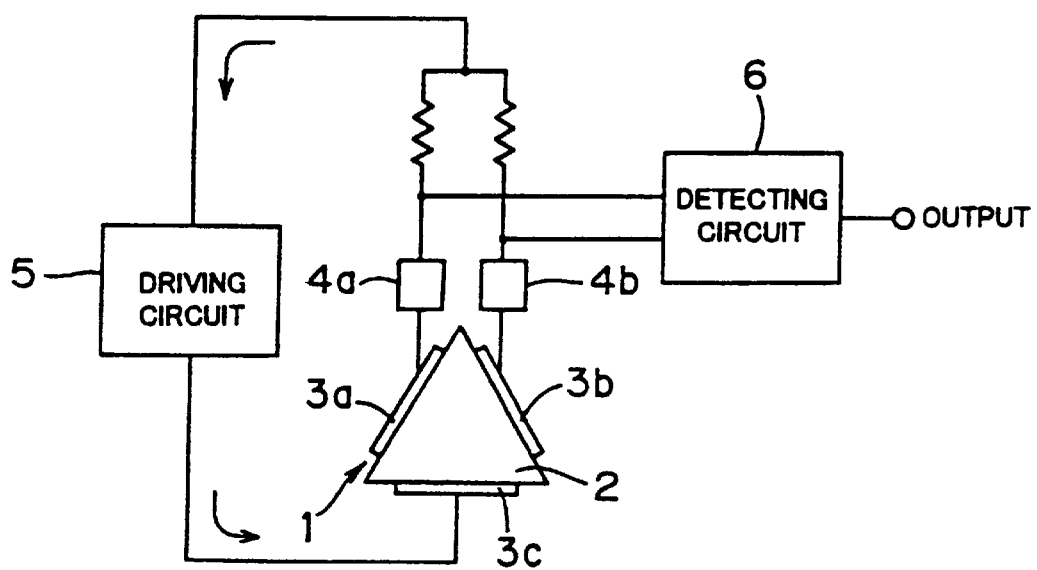
FIG. 15 is a block diagram illustrating a conventional vibrating gyroscope.
Figure 16:
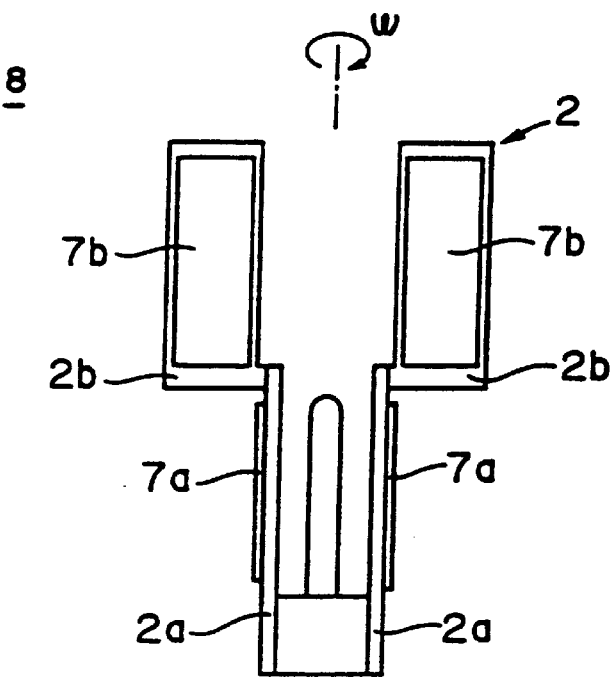
FIG. 16 is a plan view illustrating a vibrator used in another conventional vibrating gyroscope.
Figure 17:
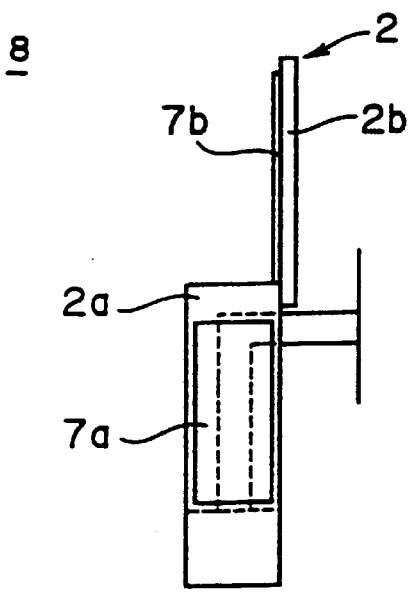
FIG. 17 is a side view illustrating the vibrator shown in FIG. 16.

The vibrator may be also formed of two detecting plates 12b forming piezoelectric devices 70a and 70b thereon one for each plate, as shown in FIG. 13. According to a sixth embodiment, in a vibrator 106 of a vibrating gyroscope 116, the piezoelectric devices 70a and 70b serve both as the detection means and the pseudo-Coriolis force generating means in this case. That is, the output signal from the pseudo-Coriolis signal generating circuit 42 is input in the piezoelectric devices 70a and 70b, which are connected to the detecting circuit 32 as well. At this time, a pseudo-Coriolis signal inverted by the inversion circuit 50 is input in one of the piezoelectric devices 70a and 70b. In this way, a pseudo-Coriolis signal is supplied to the piezoelectric devices 70a and 70b as detection means so that a force, in the direction perpendicular to that of a vibration when there is no rotation, can be produced to recognize any change in the output sensitivity of the vibrating gyroscope. In this vibrating gyroscope as in the vibrating gyroscope utilizing a column-shaped vibrating body, a single means may serve as the detection means and also as the pseudo-Coriolis force generating means.

Although in each aforementioned vibrating gyroscope, piezoelectric devices are formed on the vibrating body to be used them as the driving means, the detection means and the pseudo-Coriolis force generating means, a vibrating body may be made up of a piezoelectric object so that electrodes are formed thereon. In the vibrating gyroscope utilizing a regular triangular prism, for example, electrodes are formed at the same positions as those, shown in any of FIGS. 1, 4 or 8. The vibrating body is bending-vibrated by supplying a driving signal to the electrode as the driving means and a signal corresponding to a Coriolis force can be obtained from the electrode as the detection means. The vibrating body can be bent in a similar way when a real Coriolis force is applied, by supplying a pseudo-Coriolis signal to the electrode as the pseudo-Coriolis force generating means. Accordingly, any change in the output sensitivity of the vibrating gyroscope can be recognized by measuring an output signal of the detecting circuit.

In the vibrating gyroscope utilizing a column-shaped vibrating body, other prism-shaped vibrating bodies such as a square-, a pentagon- or a circular-prism may be utilized as a vibrating body. That is, the output sensitivity of the vibrating gyroscope can be checked by enabling the production of a pseudo-Coriolis force in the direction perpendicular to that of a basic vibration when there is no rotation.

In this way, any change in the output sensitivity of the vibrating gyroscope can be confirmed simply by applying a pseudo-Coriolis signal to determine any change in the environment and any failure of the vibrating gyroscope because of reasons such as a shock.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is claimed:

1. A vibrating gyroscope comprising:

a vibratable body;

driving means including at least one piezoelectric element formed on said vibratable body for exciting a bending vibration in said vibratable body;

detection means including at least one piezoelectric element formed on said vibratable body for detecting changes in the bending vibration of said vibratable body;

pseudo-Coriolis force generating means including at least one piezoelectric element formed on said vibratable body for applying a force to said vibratable body in a same direction as that of a Coriolis force generated when a rotational angular velocity is produced about said vibratable body; and pseudo-Coriolis signal generating means for supplying said pseudo-Coriolis force generating means with a pseudo-Coriolis signal to apply a force in the same direction as that of said Coriolis force to said vibratable body.

2. A vibrating gyroscope according to claim 1, wherein a single means serves as said driving means and also as said pseudo-Coriolis force generating means.

3. A vibrating gyroscope according to claim 1, wherein a single means serves as said driving means, as said detection means, and also as said pseudo-Coriolis force generating means.

4. A vibrating gyroscope comprising:

a column-shaped vibratable body;

driving means including at least one piezoelectric element formed on side-faces of said vibratable body for exciting a bending vibration in said vibratable body;

detection means including at least one piezoelectric element formed on side-faces of said vibratable body for detecting changes in the bending vibration of said vibratable body;

pseudo-Coriolis force generating means including at least one piezoelectric element formed on side-faces of said vibratable body for applying a force to said vibratable body in a same direction as that of a Coriolis force generated when a rotational angular velocity is produced about said vibratable body; and pseudo-Coriolis signal generating means including at least one piezoelectric element for supplying said pseudo-Coriolis force generating means with a pseudo-Coriolis signal to apply a force in the same direction as that of said Coriolis force to said vibratable body.

5. A vibrating gyroscope according to claim 4, wherein a single means serves as said driving means and also as said pseudo-Coriolis force generating means.

6. A vibrating gyroscope according to claim 4, wherein a single means serves as said driving means, as said detection means, and also as said pseudo-Coriolis force generating means.

7. A vibrating gyroscope comprising:

a tuning fork-shaped vibratable body;

driving means including at least one piezoelectric element formed on side-faces of said vibratable body for exciting a vibration in said vibratable body so as to open and close said vibratable body;

detection means including at least one piezoelectric element formed on side-faces of said vibratable body for sensing changes in a vibration of said vibratable body;

pseudo-Coriolis force generating means including at least one piezoelectric element formed on side-faces of said vibratable body for applying a force to said vibratable body in a same direction as that of a Coriolis force generated when a rotational angular velocity is produced about said vibratable body; and pseudo-Coriolis signal generating means for supplying said pseudo-Coriolis force generating means with a pseudo-Coriolis signal to apply a force in the same direction as that of said Coriolis force to said vibratable body.

8. A vibrating-gyroscope according to any of claims 1 to 7, wherein a single means serves as said detection means and also as said pseudo-Coriolis force generating means.

9. A vibrating gyroscope according to any of claims 1 to 7, wherein said vibratable body is excited in the same direction as that of said Coriolis force by applying said pseudo-Coriolis signal to said pseudo-Coriolis force generating means when said vibratable body is vibrating.

10. A vibrating gyroscope, according to claim 9, wherein a single means serves as said detection means and also as said pseudo-Coriolis force generating means.

* * * * *